(12) United States Patent
Chen et al.

(10) Patent No.: US 9,311,710 B1
(45) Date of Patent: Apr. 12, 2016

(54) METHOD FOR MEASURING WIDTH OF GAP OF DISPLAY MODULE

(71) Applicants: Inventec (Pudong) Technology Corporation, Shanghai (CN); INVENTEC CORPORATION, Taipei (TW)

(72) Inventors: Cheng-Feng Chen, Taipei (TW); Yen-Liang Chen, Taipei (TW); Wen-Sing Huang, Taipei (TW); Kuo-Feng Sung, Taipei (TW); Yu-Tse Wei, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 14/693,325

(22) Filed: Apr. 22, 2015

(30) Foreign Application Priority Data

Nov. 27, 2014 (CN) .......................... 2014 1 0697216

(51) Int. Cl.
*G06K 9/00* (2006.01)
*G06T 7/00* (2006.01)

(52) U.S. Cl.
CPC ............... *G06T 7/004* (2013.01); *G06T 7/0079* (2013.01); *G06T 7/0004* (2013.01)

(58) Field of Classification Search
None
See application file for complete search history.

(56) References Cited

U.S. PATENT DOCUMENTS

| 2014/0170923 A1* | 6/2014 | Sanglier | H01J 9/50 445/2 |
| 2015/0211707 A1* | 7/2015 | Watanabe | G02F 1/33308 345/667 |

* cited by examiner

*Primary Examiner* — Shervin Nakhjavan
(74) *Attorney, Agent, or Firm* — Locke Lord LLP; Tim Tingkang Xia, Esq.

(57) ABSTRACT

A method for measuring a width of a gap of a display module includes the following steps. A sample image of the display module is captured from a viewpoint, the sample image includes a frame region corresponding to a frame part of the display module, an inner region corresponding to a display part of the display module, and a gap region corresponding to the gap between the frame and the display parts. A first line and a second line segments are determined in the sample image, the first line segment is a part of a boundary between the frame and the gap regions, and the second line segment is a part of a boundary between the gap and the inner regions. A distance between the first line and the second line segments is calculated to obtain the width of the gap.

7 Claims, 3 Drawing Sheets

METHOD FOR MEASURING WIDTH OF GAP OF DISPLAY MODULE

CROSS-REFERENCE TO RELATED APPLICATIONS

This non-provisional application claims priority under 35 U.S.C. §119(a) on Patent Application No(s). 201410697216.8 filed in China on Nov. 27, 2014, the entire contents of which are hereby incorporated by reference.

TECHNICAL FIELD

The present disclosure relates to a method for measuring a width of a gap of a display module, and more particularly to a method for measuring a width of a gap of a display module by using an image recognition technology to detect an edge of each region of an image of the display module and calculating the width of the gap according to line segments of the edges of the regions.

BACKGROUND

With the advancement of contemporary technology, a variety of production techniques have been improved. Method of mass production has been developed to become fully automatic production process from the labor-intensive operation to pursue the improvement of production efficiency and reduction of manufacturing costs.

During a present production process of the display module, a width of a gap between parts of the display module needs to be measured, e.g., a gap between a central display area of the display module and a frame located at an edge of the display module. In general, a user can use a digital optical microscope with his/her eyes to measure and determine the width of the gap. However, this kind of measurement takes too much time and is not accurate enough to meet with a quality check.

SUMMARY

The disclosure provides a method for measuring a width of a gap of a display module. The method includes the following steps: First, a sample image of the display module is captured from the viewpoint. The sample image includes a frame region, an inner region and a gap region, the frame region corresponds to the frame part of the display module, the inner region corresponds to the display part of the display module, and the gap region corresponds to the gap between the frame part and the display part. The first line segment and the second line segment are selected in the sample image. The first line segment is a part of a boundary between the frame region and the gap region, and the second line segment is a part of a boundary between the gap region and the inner region. The distance between the first line segment and the second line segment is calculated to obtain the width of the gap of the display module.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
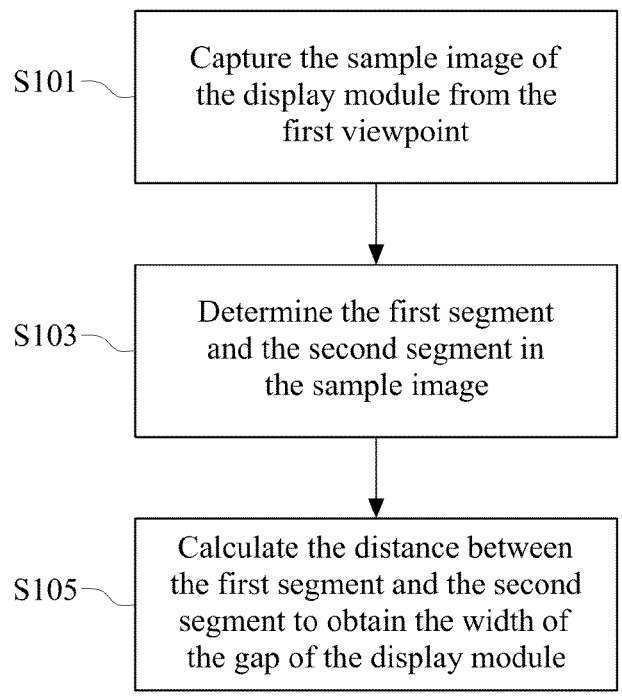
FIG. 1 is a flowchart of a method for measuring a width of a gap of a display module according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1. FIG. 1 is a flowchart of a method for measuring a width of a gap of a display module according to one embodiment of the present disclosure. As shown in FIG. 1, in step S101, a sample image of a display module is captured from a viewpoint. The sample image includes a frame region, an inner region and a gap region. The frame region corresponds to a frame part of display module, e.g., a side frame located on edges of the display module. The inner region corresponds to a display part of the display module, e.g., a central display region of the display module. The gap region corresponds to a gap between the frame part and the display part. The capturing of the sample image of the display module is described in detail below.

Figure 2:
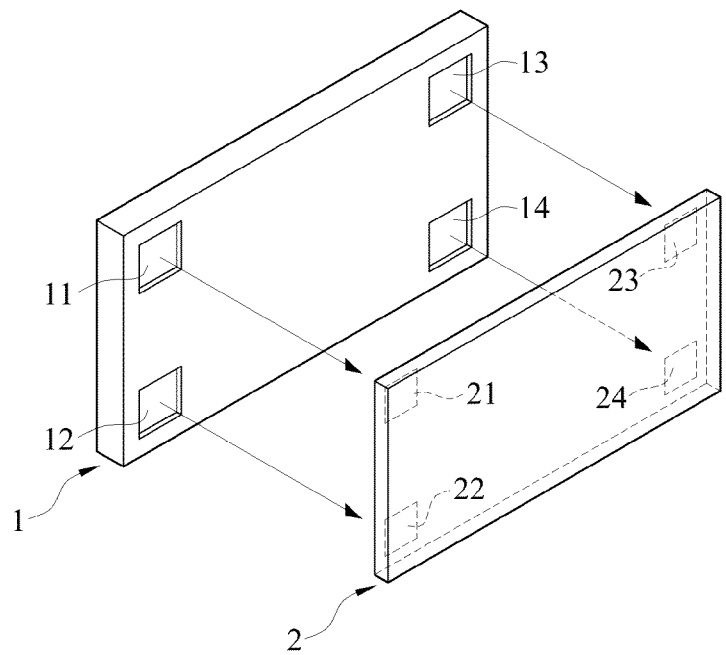
FIG. 2 is a schematic view of a fixture and a display module according to one embodiment of the disclosure.

Please refer to FIG. 2, which is a schematic view of a fixture and a display module according to one embodiment of the present disclosure. As shown in FIG. 2, the fixture 1 includes four camera modules 11, 12, 13 and 14, and the camera modules 11, 12, 13 and 14 can capture sample images of the four corners 21, 22, 23 and 24 of the display module 2 from their viewpoints, respectively. The display module 2 covers the fixture 1 when the display module 2 is disposed on the fixture 1, and therefore each of the four camera modules 11, 12, 13 and 14 on the fixture 1 correspond to and face the four corners 21, 22, 23 and 24 of the display module 2, respectively, for capturing the sample images. The detail of the sample image is described below.

Figure 3:
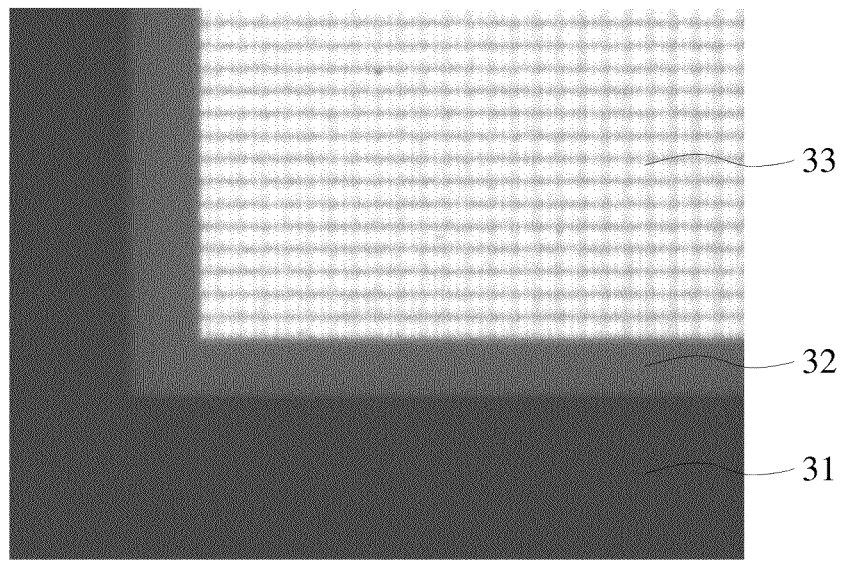
FIG. 3 is a schematic view of a sample image according to one embodiment of the disclosure.

Please refer to FIG. 3, which is a schematic view of a sample image according to one embodiment of the present disclosure. As shown in FIG. 3, the sample image is a gray scale image, different regions of the sample image have different scales of gray colors, which means color differences are different between the regions with different scales. The region with the darkest pixel color is the frame region 31, which corresponds to the side frame part of the display module 2. The pixel color in The middle region with the pixel color lighter than the frame region 31 is the gap region 32, which corresponds to the gap between the frame part and the display part of the display module 2. The inner region with the lightest pixel color among the regions is the inner region 33, which corresponds to the display part of the display module 2.

Figure 4:
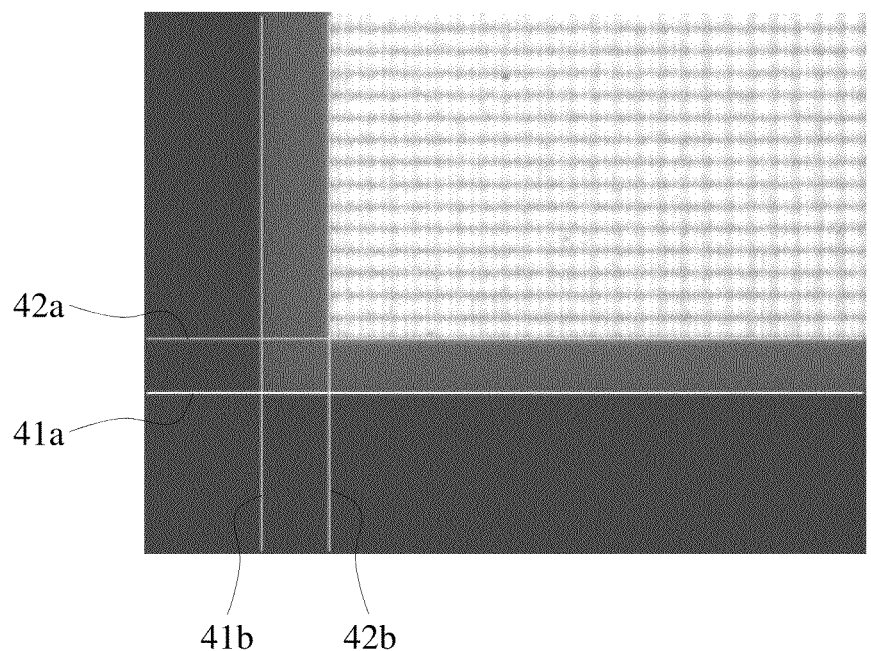
FIG. 4 is another schematic view of a sample image according to one embodiment of the disclosure.

Then, in step S103, the first line segment and the second line segment are determined in the sample image. For example, the first and second line segments are shown in FIG. 4, which is another schematic view of a sample image according to one embodiment of the present disclosure. In this step, a horizontal first line segment 41*a*, a longitudinal first line segment 41*b*, a horizontal second line segment 42*a* and a longitudinal second line segment 42*b* are detected by the image recognition algorithm according to the color differences between the pixels of the sample image. The image recognition algorithm will be fully described in the following specification. Therefore, edges of each of the regions of the sample image can be specifically recognized. Specifically, the horizontal first line segment 41*a* and the longitudinal first line segment 41*b* represent the boundaries between the frame region and the gap region, and the horizontal second line segment 42*a* and the longitudinal second line segment 42*b* represent the boundaries between the gap region and the inner region.

Then, in step S105, the distance between the first line segment and the second line segment is calculated. In this step, the horizontal first line segment 41*a* and the horizontal second line segment 42*a* correspond to each other, and the longitudinal first line segment 41*b* and the longitudinal second line segment 42*b* correspond to each other. Therefore the distance between the two line segments 42*a* and 42*b* can be calculated according to the two line segments 42*a* and 42*b*. The aforementioned distance can be a real physical distance from the pixel distance between the two line segments 42*a* and 42*b* in the sample image through a conversion formula. For example, there is a ratio relationship between the pixel distance and the physical distance, such as a pixel corresponds to a specific millimeter. Therefore the physical distance can be obtained by converting the ratio relationship, but the disclosure is not limited to the above-mentioned method for calculating the distances.

Figure 5:
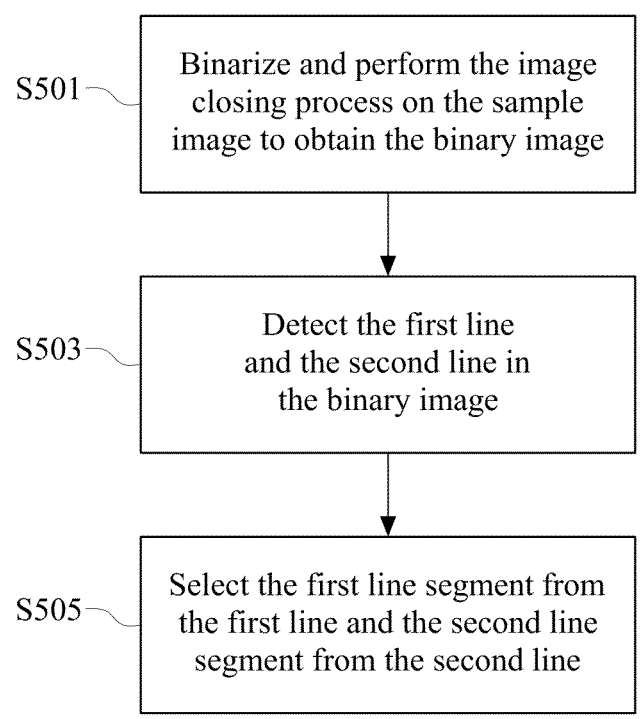
FIG. 5 is a flowchart of the step that a first line segment and a second line segment in a sample image are determined according to one embodiment of the disclosure.

The foregoing algorithm for selecting the first line segment and the second line segment in the sample image in aforementioned step S105 shown in FIG. 1 is described in FIG. 5, which is a flowchart of the step that a first line segment and a second line segment in a sample image are determined according to one embodiment of the present disclosure. In step S501, as shown in FIG. 5, the sample image is binarized to perform an image closure to obtain a binary image. Specifically, Otsu's method and Closing method are used in this step.

The Otsu's method is used for dividing the image into a foreground object and a background object according to the gray scale of each pixel of the image by a specific threshold value (i.e. pixel value) and binarizing the image. With the Otsu's method, the sample image can be divided into the foreground and the background for subsequent processes. For example, the pixels of the foreground object in the image present black and the pixels of the background object present white after the aforementioned algorithm is performed. Thus, the binarized image is obtained. However, the disclosure is not limited to the method for classifying the foreground and the background by the foregoing algorithm.

Then, after the binarized image is obtained, the foreground object in the image is closed by using the image closure method. Since errors may occur in classification of the foreground and the background, the foreground may have recesses, holes or breakings and some edges the foreground object may not be definitely-closed (i.e., continuous) curves. Thus, to deal with such aforementioned problems, the image closure method is performed on the binarized image. In the image closure method, the image is dilated and then eroded such that the foreground object of the image is closed. The image closure method in the present disclosure is not limited to this algorithm.

In step S503, the first line and the second line are detected in the binarized image, the first line is the boundary between the frame region and the gap region, and the second line is the boundary between the gap region and the inner region. At this step, the method for detecting the edges of the gap region and the inner region is by using Canny edge detection. Canny edge detection is used to reduce noises of the image by using Gaussian filter to find the brightness gradient in the image, and then to classify whether or not each of the pixel belongs to pixel of the line by using the threshold value to obtain the binarized image of the edge of the object. The edge detecting method of the present disclosure is not limited to the foregoing algorithm.

In step S505, the first line segment and the second line segment are selected from the first line and the second line, respectively. In this embodiment, Hough transform algorithm is used in this step. Hough transform is a widely-used method for recognizing a geometric figure in the image processing is not influenced by figure rotation, and is easy to perform the conversion of the geometric figure rapidly. In a situation, the aforementioned first line and the second line may be zig-zagged lines constructed by pixels, rather than ideal straight lines. To deal with such situation, the Hough transform is used for selecting the straight lines, i.e. the first and second line segments, from the first and second lines, respectively. The method of selecting line segment in the present disclosure is not limited to this algorithm.

In one embodiment, the distance between the two line segments is calculated according to the first line segment and the second line segment that are obtained by step S505. For example, a distance calculating method is used to calculate the pixel distance between the two line segments, and then to obtain a real physical distance through the conversion process. The distance calculating method in the present disclosure is not limited herein.

The distance as calculated above can be detected through a manual judgment or an automatic program to determine whether or not the display module meets with a quality standard of the assembling process during the detection. For example, first, a threshold value is preset. If the distance of the gap detected is less than the preset threshold value, it means the display module meets with the quality standard; if the distance of the gap detected is higher than the threshold value, it means the display module does not meet with the quality standard.

As described above, in the method for measuring a width of a gap of a display module of the present disclosure, the sample image is captured by using the camera, the boundary between the frame part and the gap and the boundary between the gap and the display part in the sample image are detected by using image recognition technique to find the straight-line segment which corresponds to the line, and the distance of the gap is calculated according to the straight-line segment. Since the distance is automatically calculated for determination, the time of manual measurement and the error rate can be reduced, such that the production efficiency is enhanced and the labor costs are reduced.

What is claimed is:

1. A method for measuring a width of a gap of a display module, comprising steps of:

capturing a sample image of the display module from a viewpoint, the sample image comprising a frame region, an inner region and a gap region, the frame region corresponding to a frame part of the display module, the inner region corresponding to a display part of the display module, and the gap region corresponding to the gap between the frame part and the display part;

determining a first line segment and a second line segment in the sample image, the first line segment being a part of a boundary between the frame region and the gap region, the second line segment being a part of a boundary between the gap region and the inner region; and calculating a distance between the first line segment and the second line segment to obtain the width of the gap of the display module.

2. The method for measuring the width of the gap of the display module of claim 1, wherein the step of determining the first line segment and the second line segment in the sample image comprises:

binarizing and performing an image closing process on the sample image to obtain a binary image;

detecting a first line and a second line in the binary image, the first line corresponding to the boundary between the frame region and the gap region, the second line corresponding to the boundary between the gap region and the inner region, and selecting the first line segment from the first line and the second line segment from the second line.

3. The method for measuring the width of the gap of the display module of claim 2, wherein in the step of binarizing the sample image, pixels of the sample image are classified into at least a foreground object and a background object according to pixel values of the pixels, the foreground object is a foreground of the sample image, the background object is a background of the sample image, the foreground object has one of two pixel values representing black and white, and the background object has the other one of the two pixel values representing black and white.

4. The method for measuring the width of the gap of the display module of claim 2, wherein the sample image is binarized by an Otsu's method, and the image closing process is performed by a close operation.

5. The method for measuring the width of the gap of the display module of claim 2, wherein the first line and the second line are detected by a Canny edge detection.

6. The method for measuring the width of the gap of the display module of claim 2, wherein the first line segment and the second line segment are selected by a Hough transform method.

7. The method for measuring the width of the gap of the display module of claim 1, wherein the distance between the first line segment and the second line segment is a physical distance converted from a pixel distance between the first line segment and the second line segment.

* * * * *